US012482002B2

(12) United States Patent
Kumar et al.

(10) Patent No.: US 12,482,002 B2
(45) Date of Patent: Nov. 25, 2025

(54) METHOD AND SYSTEM FOR GENERATIVE AI WITH DYNAMIC PERSONA ADAPTATION AND APPLICATIONS THEREOF

(71) Applicant: Verizon Patent and Licensing Inc., Basking Ridge, NJ (US)

(72) Inventors: Durgesh Kumar, Bangalore (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 316 days.

(21) Appl. No.: 18/447,839

(22) Filed: Aug. 10, 2023

(65) Prior Publication Data
US 2025/0053992 A1    Feb. 13, 2025

(51) Int. Cl.
| | |
|---|---|
| G10L 15/22 | (2006.01) |
| G06F 40/30 | (2020.01) |
| G06Q 30/015 | (2023.01) |
| G06Q 30/0601 | (2023.01) |
| G10L 13/02 | (2013.01) |
| G10L 13/027 | (2013.01) |
| G10L 15/02 | (2006.01) |
| G10L 15/183 | (2013.01) |
| H04M 3/493 | (2006.01) |

(52) U.S. Cl.
CPC ........... *G06Q 30/015* (2023.01); *G06F 40/30* (2020.01); *G06Q 30/0617* (2013.01); *G10L 13/02* (2013.01); *G10L 13/027* (2013.01); *G10L 15/02* (2013.01); *G10L 15/183* (2013.01); *G10L 15/22* (2013.01); *H04M 3/493* (2013.01)

(58) Field of Classification Search
CPC ....... G10L 15/16; G10L 15/22; G10L 15/183; G06Q 50/01; G06Q 30/0282; G06Q 30/02; G06Q 50/00; G06Q 10/10; G06Q 30/00; G06Q 705/347; G06F 17/00
USPC .......................................................... 705/346
See application file for complete search history.

(56) References Cited

U.S. PATENT DOCUMENTS

| | | | |
|---|---|---|---|
| 10,621,978 B2 * | 4/2020 | Zamora Duran | ....... G10L 15/24 |
| 2003/0202017 A1 * | 10/2003 | Fukuoka | ................ G06Q 30/06 |
| | | | 715/809 |
| 2024/0289863 A1 * | 8/2024 | Smith Lewis | ......... G06N 3/008 |
| 2024/0412720 A1 * | 12/2024 | Vasylyev | .......... G06F 16/90332 |
| 2025/0133038 A1 * | 4/2025 | Shang | ..................... G10L 15/26 |

FOREIGN PATENT DOCUMENTS

| | | | | |
|---|---|---|---|---|
| CN | 112256857 B | * | 2/2023 | ............... G06N 3/08 |
| CN | 112182161 B | * | 10/2023 | ......... G06F 16/3329 |

* cited by examiner

*Primary Examiner* — Daniel Abebe

(57) ABSTRACT

The present teaching relates to conduct persona-adaptive communications with a customer at a geo-locale. Transcripts of a current and historic communications involving the customer are used to characterize the persona of the customer. Transcripts of historic communications with customers at the geo-locale are used to characterize the persona of the geo-locale. Current persona of the customer exhibited in the current communication is combined with the customer's persona and the geo-locale's persona to compute a response input vector, A language model generates, based on the response input vector, a persona-adaptive response, which is then sent to the customer a response.

20 Claims, 11 Drawing Sheets

METHOD AND SYSTEM FOR GENERATIVE AI WITH DYNAMIC PERSONA ADAPTATION AND APPLICATIONS THEREOF

BACKGROUND

Generative artificial intelligence (AI) creates content, including visual, acoustic, and/or textual information, in response to inquiries. Generative AI has been used in conversational chatbots in various applications such as response customer service inquiries, where companies can address customer concerns and support its customers by deploying agents to communicate, through either voice or text, with customers whenever there is a need. Automated chat agents may be implemented based on generative AI to carry on conversations with customers. Whether such communications are in voice or text, the automated tend to converse in a predetermined manner for every customer.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF EXAMPLE EMBODIMENTS

Figure 1A:
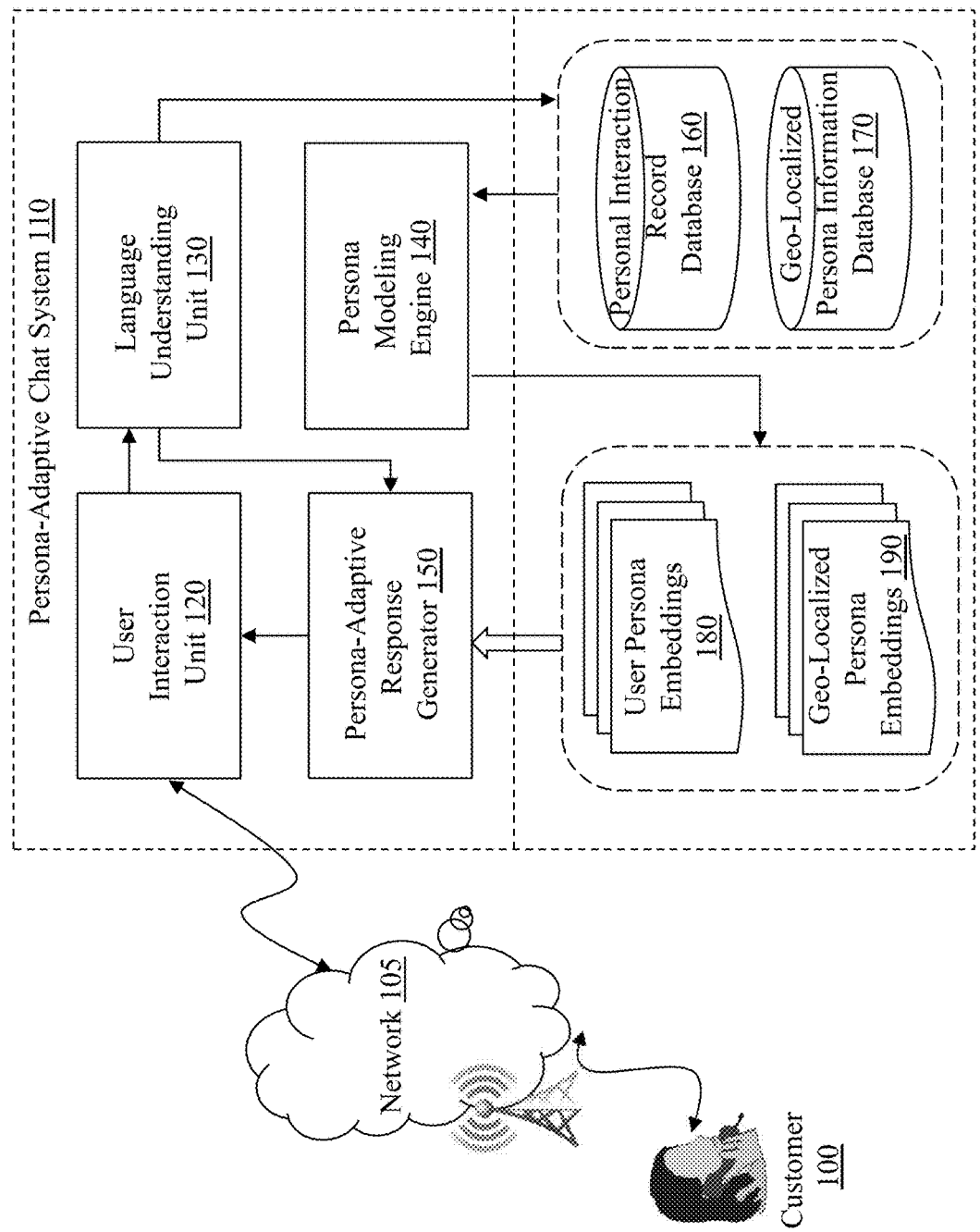
FIG. 1A depicts an exemplary high level system diagram of a persona-adaptive chat system for conducting persona-adaptive communication with customers, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching is directed to a persona-adaptive chat system that carries on a communication with a customer with a persona dynamically adapted to both the customer and the locale where the customer is. Traditional chat systems conduct conversations in a predetermined and fixed manner without an individualized and locally adapted persona. Regardless of the differences in customers' ways of expressing information due to individual styles or conventions associated with different personalities and geo-locales, traditional chat systems conduct communications with all customers in any locale in the same manner, incapable of offering individualized or locally adapted communication capacity to enhance customers' experiences. This can lead to customer disengagement or lack of contextual information being shared.

The present teaching discloses a persona-adaptive chat system capable of communicating with each customer with a persona adapted not only to the customer (individual persona) but also to the specific locale (geo-localized persona) where the customer is located. The individual persona may be established in each communication based on customer's baseline and presently exhibited persona (may be different). For example, although a customer may be generally known as mellow-tempered, when calling to report an urgent issue, the customer may act with a changed personality (e.g., irritable). Thus, the adapted persona with respect to the customer in a particular communication may be situation dependent. The insights about the baseline persona of each customer may be characterized by analyzing prior communications and the contextual information associated therewith. Such insights may include, e.g., certain vocabulary and/or grammar that the customer uses due to personal preferences and/or the demographic group(s) to which the customer belongs.

Similarly, to conduct a communication with a customer in a particular region, the persona appropriate for the communication may also depend on the known communication characteristics associated with the region. For example, certain vocabulary and/or grammar customarily used by people in the locale, which may be related to the main demographics of the locale, usual emotions exhibited in past communications with people in the locale, and possibly certain known intents linked to the locale detected from past communications occurred at the locale. Insights about personae exhibited in communications at different regions may be captured based on the transcript of previous communications at these regions (and possibly nearby regions). For example, if a conversation involves a customer in a particular region (e.g., a small town in Texas), the customer may often have used certain vocabulary and expressed sentences with some specific grammatical characteristics. Such contextual information may be leveraged by the persona-adaptive chat system according to the present teaching to geo-localized the persona of a chat agent to that associated with the region of each customer, together with the individual persona captured for the customer. In this way, a communication with each specific customer at a region may be conducted in a persona that is more familiar and comfortable to the customer.

According to the present teaching, machine learning is applied to capture relevant features/characteristics associated with persona adapted for each customer based on training data, which may include both customer's prior communications as well as communications at different geo-locales. To learn insights about a customer, transcripts of historic communications involving the customer may be collected and analyzed to detect features indicative of the customer's persona, such as, e.g., particularly vocabulary preferred, specific grammars used in the communications, demographic information of the customer, etc. Such detected features may be used as training data for deep machine learning of user persona embeddings to capture the characteristics of the customer's general or baseline persona. In an ongoing conversation, such learned user persona embeddings are used to generate hyper-contextual persona vector as input the persona-adaptive chat system for responding to the customer with an appropriate persona.

To learn insights related to persona associated with each geo-locale, transcripts of past conversations associated with each geo-locale may be collected and analyzed. In some embodiments, different features may be extracted from such transcripts and used as training data for capturing the persona for each geo-locale. For example, features extracted from transcripts may include, e.g., intent associated with the geo-locale (e.g., to activate international coverage), emotional state exhibited (e.g., in a hurry), and number of events with respect to each detected intent to reflect, e.g., statistical likelihood. Such features may then be used as training data for machine learning of geo-localized embeddings, which may be used in subsequent ongoing conversation at a specific geo-locale to derive a geo-localized persona vector for the ongoing communication for adapting a chat agent to have a persona appropriate for the geo-locale.

To adapt the persona of a chat agent during an ongoing conversation with a customer who is at a particular geo-locale, the hyper-contextual persona vector for the customer as a baseline persona and the geo-localized person vector as a baseline persona for the geo-locale may be combined to generate a user persona vector characterizing the geo-localized baseline persona for the customer. As a customer may exhibit a persona deviating from his/her baseline persona in an ongoing conversation, specific attributes the customer exhibited in the ongoing conversation may also be considered in persona adaptation. A current persona vector may be derived based on transcripts of the ongoing conversation using the learned user persona embeddings. The user persona vector (capturing the general baseline persona) and the current persona vector (capturing the specific persona in the ongoing conversation) may be used by the persona-adaptive chat system to determine an adapted persona used in the ongoing conversation with the customer. In some embodiments, a pretrained language model may be deployed that may take transcripts of the ongoing conversation, the user persona vector, as well as current persona vector as input and generate a response to the customer with a persona determined according to the input.

According to the present teaching, the persona-adaptive chat system may be applied to communications conducted in either voice or text. In a voice-based communication, voice input from a customer may be processed via language understanding to generate text transcripts. A response to the customer may be generated by a language model in the persona-adaptive chat system with textual expressions determined based on the adaptive persona. Such textual expressions may then be delivered to the customer via text-to-speech conversion. In some embodiments, the text-to-speech conversion used to deliver voice version of the persona-adaptive textual response to the customer may also be persona-adapted to, e.g., using an accent that is appropriate to the customer, which may further enhance the customer's experience. Details of the persona-adaptive chat system according to the present teaching are provided below with reference to FIGS. 1A-5B.

FIG. 1A depicts an exemplary high level system diagram of a persona-adaptive chat system 110 for conducting persona-adaptive communications with customers, in accordance with an embodiment of the present teaching. In this illustrated embodiment, the persona-adaptive chat system 110 includes a frontend portion and a backend portion. The frontend portion interfaces with a customer 100 via a network 105. The backend portion may provide relevant data collected from different sources and archived in different databases to provide training data for machine learning to derive various embeddings used by the frontend portion to generate persona related vectors during a communication with a customer in order to conduct a persona-adaptive conversation.

The frontend portion may comprise a user interaction unit 120, a language understanding unit 130, a persona-adaptive response generator 150, and a persona modeling engine 140. Via the user interface unit 120, the persona-adaptive chat system 110 receives the input from the customer 100, which may be voice or text. The language understanding unit 130 may analyze the input from the user, understand the semantics of the customer's communication. The persona-adaptive response generator 150 may then generate a response to the customer 100 that is expressed with a persona adapted to the customer 100, determined according to different feature vectors generated based on embeddings stored in the backend portion. Details about types of feature vectors and corresponding embeddings will be provided below. Such feature vectors may be used by persona-adaptive response generator 150 as basis to generate a persona-adapted response, which may be voice or text, depending on an application. The response is personalized and persona-adapted for the customer with respect to a geo-locale where the customer is. The persona-adaptive response may then be used by the user interaction unit 120 to deliver the response to customer 100 via network 105.

The backend portion includes user persona embeddings 180, derived via machine learning based on transcripts archived in a personal interaction record database 160, and geo-localized persona embeddings 190, derived via machine learning based on transcripts archived in a geo-locale persona information database 170. The user persona embeddings 180 may include different sets of parameters and each set of such embedding parameters is associated with a customer and learned via training based on communications involving the customer and used (by the persona-adaptive response generator 150) to obtain feature vectors characterizing the persona of the customer exhibited in communications involving the customer. The geo-localized persona embeddings 190 may include different sets of embedding parameters and each set of such embedding parameters is associated with a geo-locale (e.g., a town or a local airport) and derived based on communications with customers while they were present at the geo-locale. The geo-localized persona embeddings 190 may be used (by the persona-adaptive response generator 150) to obtain feature vectors characterizing the persona of the geo-locale exhibited in communications occurred at the geo-locale.

The network 105 as illustrated in FIG. 1A may be a local area network (LAN), a wide area network (WAN), a public network, a private network, a proprietary network, a Public Telephone Switched Network (PSTN), the Internet, a wireless network, a virtual network, or any combination thereof. Such a network or any portions thereof may be a 4G network, a 5G network, or a combination thereof. The network 105 may also include various network access points, e.g., wired, or wireless access points such as base stations or Internet exchange points, through which a particular customer may connect to the network in order to provide and/or transmit information to a specific destination. The information communicated between customer 100 and the persona-adaptive chat system 110 via network 105 may be delivered as bitstreams which may be encoded in accordance with certain industrial standards, such as MPEG4 or H.26x, and the network may be configured to support the transport of such encoded data streams.

Figure 1B:
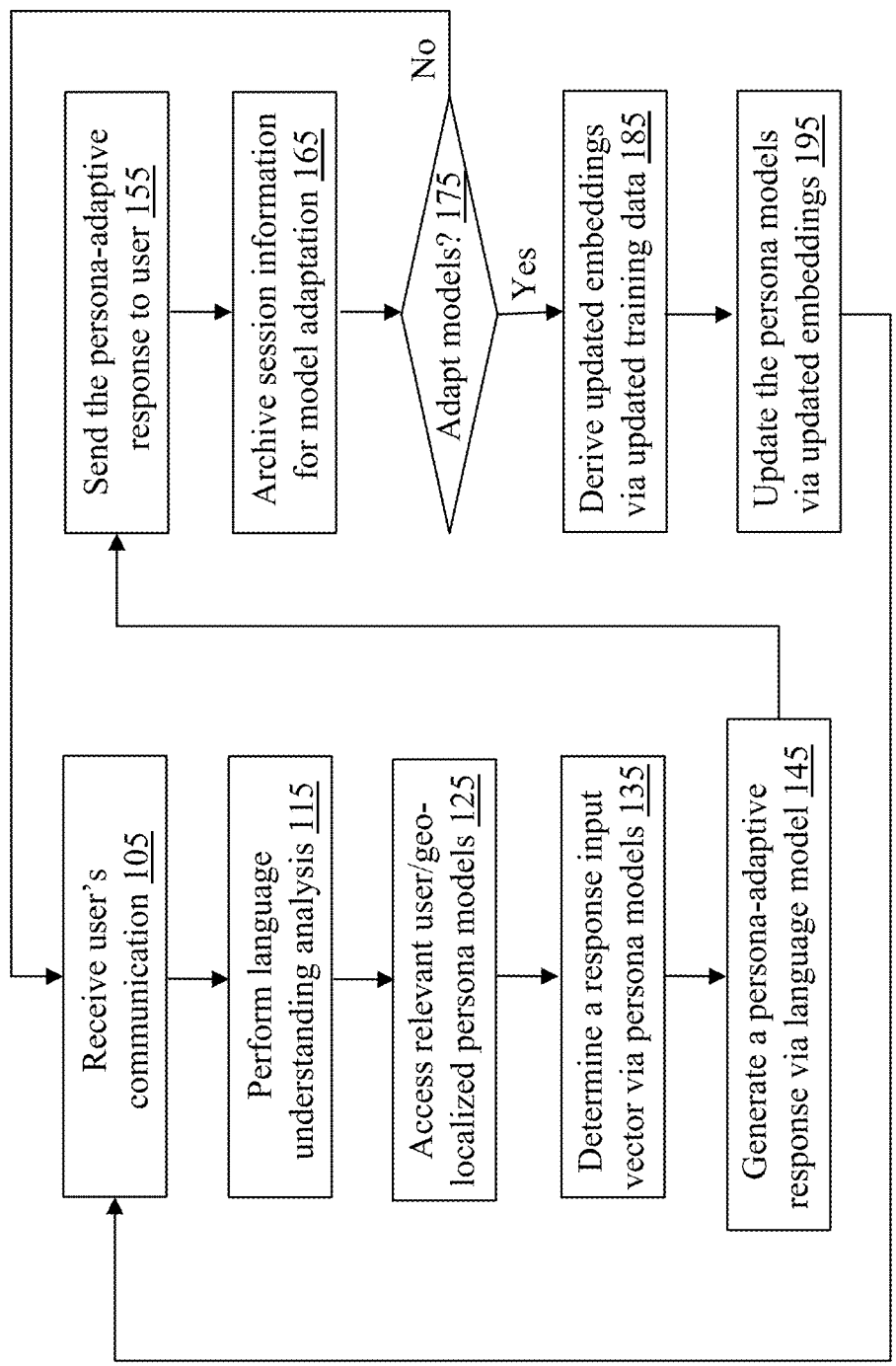
FIG. 1B is a flowchart of an exemplary process of a persona-adaptive chat system for conducting persona-adaptive communication with customers, in accordance with an embodiment of the present teaching.

FIG. 1B is a flowchart of an exemplary process of the persona-adaptive chat system 110 for conducting persona-adaptive communications with customers, in accordance with an embodiment of the present teaching. When the persona-adaptive chat system 110 receives a customer's communication at 105, it performs, at 115, language understanding analysis to understand what is communicated by the customer 100. The persona-adaptive response generator 150 accesses, at 125, relevant user and geo-localized persona embeddings (from 180 and 190, respectively) and determines, at 135, a response input vector based on the accessed persona related vectors. The response input vector may correspond to a vector to be provided to a language model as an input for generating a persona-adaptive response.

Figure 2:
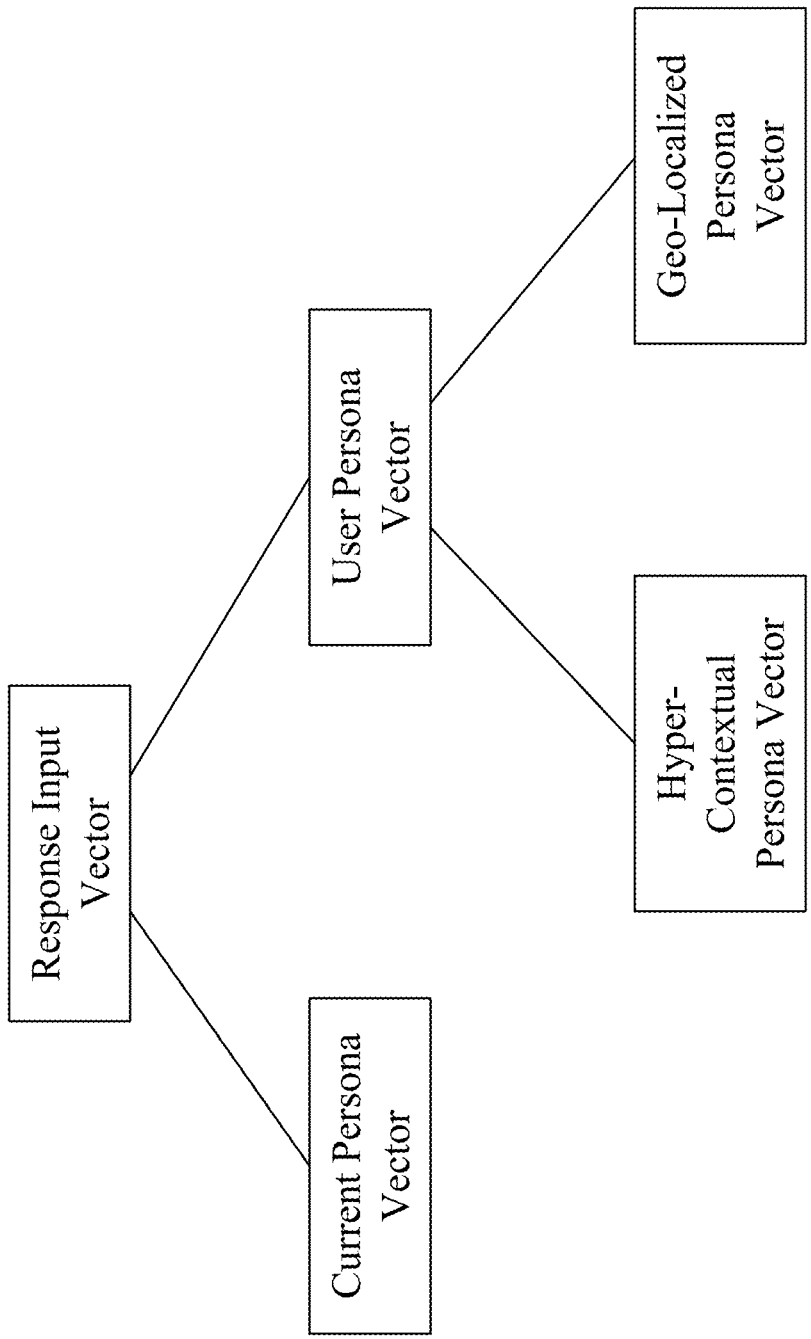
FIG. 2 illustrates an exemplary response input vector and exemplary types of component vectors used in persona-adaptive communication, in accordance with an embodiment of the present teaching.

The response input vector may capture different aspects of persona-related features, including baseline persona features of the customer, the characterization of the persona of a geo-locale where the customer is during the communication, and the current persona the customer is exhibiting during the current communication. FIG. 2 illustrates an exemplary response input vector composition with exemplary types of component vectors relevant in persona adaptation, in accordance with an embodiment of the present teaching. As illustrated, a response input vector may include a user persona vector and a current person vector. The former may characterize the features related to the customer's general or baseline persona, including the customer's own individual persona as well as the person associated with the geo-locale where the customer is currently at. For example, a customer may reside in a southern city where people there may have some special ways of expressing. In addition to that, the customer may be known for soft spoken and talk slowly. Both the typical persona of the southern city and the individual talking style may dictate how the customer express and carries on the conversion.

As shown in FIG. 2, the user persona vector may include a hyper-contextual persona vector, capturing the customer's individual persona, and a geo-localized person vector, capturing the persona of the geo-locale of the customer. As discussed herein, a customer may exhibit, in a communication, a persona that deviates from the known baseline persona of the customer. As such, the persona exhibited during the current communication may also play a role in determining an appropriate persona for the chat agent that is appropriate for the current persona of the customer. Given that, the response input vector may also incorporate a current persona vector that captures the persona that the customer is currently exhibiting during the ongoing communication. In this way, the input to a language model to generate a persona-adaptive response incorporates not only information about the baseline persona of the customer but also the onset exhibition of the customer's persona.

Based on the response input vector to a language model, the persona-adaptive response generator 150 generates, at 145, a persona-adaptive response to be used to respond to the input from the customer 100 and sends, at 155, the generated persona-adaptive response to the customer 100, via the user interaction unit 120 and the network 105. In some embodiments, the customer input as well as the newly generated persona-adaptive response to respond to the customer input may then be archived, at 165, in the personal interaction record database 160 and/or the geo-localized persona information database 170 for continued model-based persona adaptation, which may be performed regularly based on, e.g., a schedule or via dynamic activation. If model adaptation is not yet called for, determined at 175, the processing returns to step 105 to wait for the next input from the customer 100. If model adaptation is needed, the persona modeling engine 140 may be invoked to, e.g., derive updated embeddings based on updated training data (in 160 and/or 170) via re-training or incremental training so that the persona models corresponding to the user persona embeddings 180 and/or geo-localized persona embeddings 190 may be updated, at 195, accordingly.

Figure 3A:
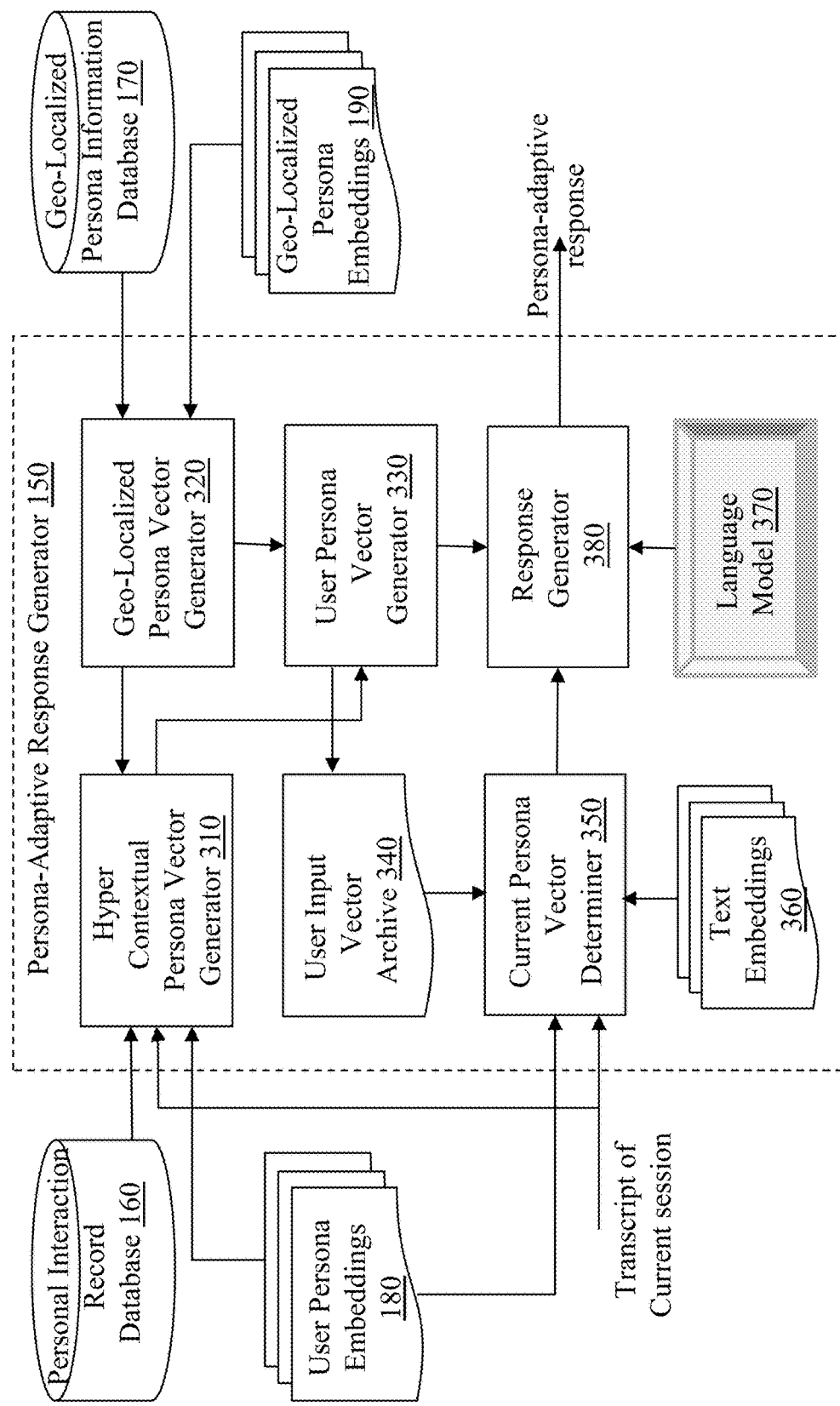
FIG. 3A depicts an exemplary high level system diagram of a persona-adaptive response generator, in accordance with an embodiment of the present teaching.

FIG. 3A depicts an exemplary high level system diagram of the persona-adaptive response generator 150, in accordance with an embodiment of the present teaching. As discussed herein, a persona-adaptive response may be generated by a language model based on a response input vector comprising a user persona vector and a current persona vector, with the user persona vector comprising a hyper-contextual persona vector and a geo-localized persona vector. In addition, the language model used for generating a persona-adaptive response based on the response input vector may be trained via machine learning based on training data of past conversations. Depending on the nature of an application where the present teaching may be relied on, the training data may be domain dependent with a vocabulary appropriate for domain associated with the application.

To fulfill such function roles, the persona-adaptive response generator 150 comprises, as illustrated in FIG. 3A, a hyper contextual persona vector generator 310, a geo-localized persona generator 320, a user persona vector generator 330, a current persona vector determiner 350, and a response generator 380. The hyper contextual persona vector extractor 310 may be provided for obtaining a hyper contextual persona vector for a customer engaged in an ongoing communication based on both historic (from the personal interaction record database 160) and present communications (transcript of the current communication session) involving the customer. This may allow the system to establish a baseline persona of the user based on both past and current communications.

The geo-localized persona vector generator 320 may be provided for obtaining a geo-localized persona vector, characterizing the regional persona of the geo-locale where the customer is, based on transcripts of historic communications with different customers at the same geo-locale. The user persona vector generator 330 may combine the hyper contextual persona vector for the customer and the geo-localized persona vector for the geo-locale of the customer to yield a user persona vector. As such, the user persona vector characterizes the persona of the customer established according to both the baseline persona of the user as well as the regional persona of the geo-locale where the customer is. The generated user persona vector is provided to the response generator 380 as an input for obtaining a persona-adaptive response.

Another input to the response generator 380 is a current persona vector. In the illustrated embodiment, the current persona vector determiner 350 is provided to characterize the instant persona of the customer exhibited during the current communication. Utilizing the text embeddings 360, the current persona vector determiner 350 generates the current persona vector for the customer based on the transcript of the ongoing communication. With the user persona vector (from the user persona vector generator 330) and the current persona vector (from the current persona vector determiner 350), the response generator 380 may be provided to combine them to create a response input vector as an input to a language model 370 for producing a persona-adaptive response. Such generated persona-adaptive response may then be output as a response to the utterance/text of the customer.

Figure 3B:
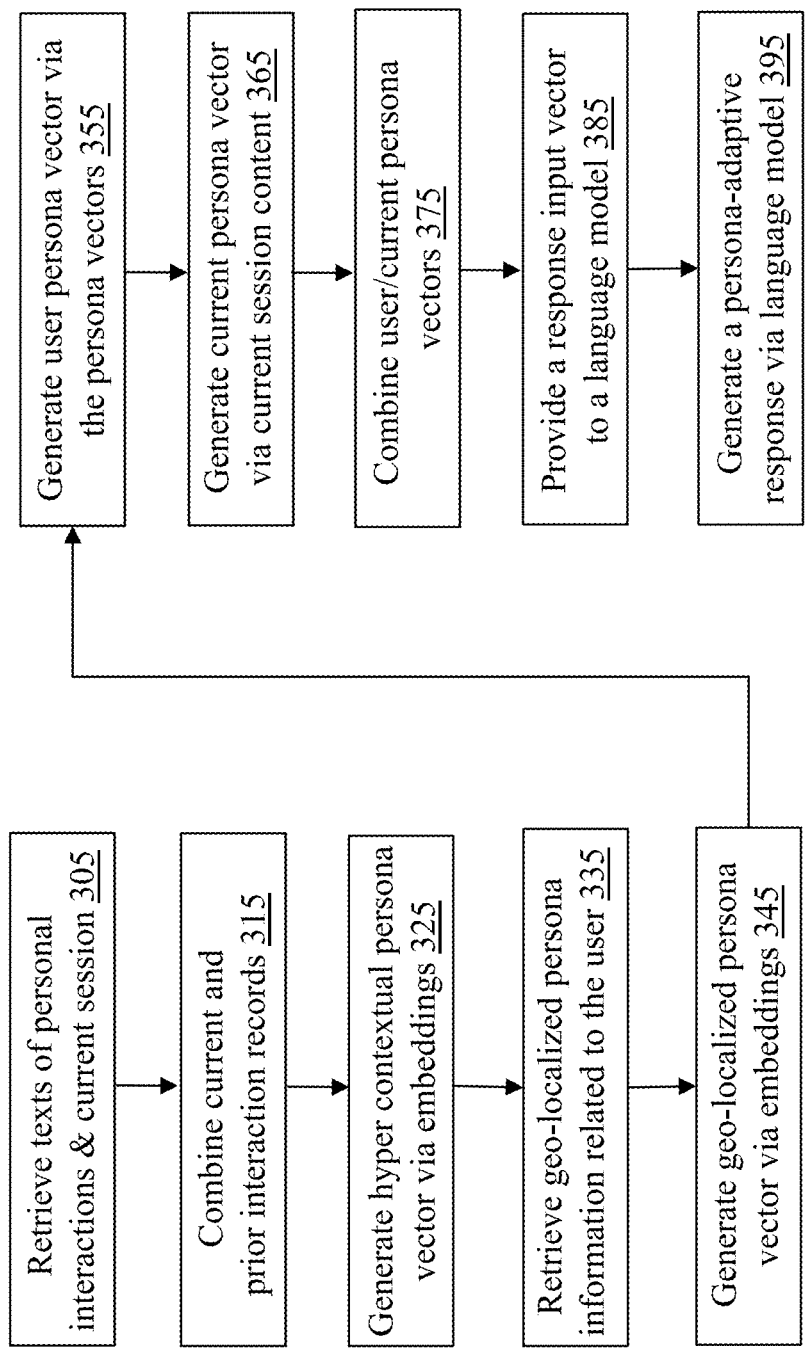
FIG. 3B is a flowchart of an exemplary process of a persona-adaptive response generator, in accordance with an embodiment of the present teaching.

FIG. 3B is a flowchart of an exemplary process of the persona-adaptive response generator 150, in accordance with an embodiment of the present teaching. To generate a hyper contextual persona vector, the hyper contextual persona vector generator 310 retrieves, at 305, transcripts of personal interactions stored in database 160 and the current communication session. The transcripts of past and current communications are combined at 315 and used to generate, at 325, a hyper contextual persona vector based on user persona embeddings 180. To generate a geo-localized persona vector, the geo-localized persona vector generator 320 retrieves, at 335, geo-localized persona information from database 170 for generating, at 345, a geo-localized persona vector based on geo-localized persona embeddings 190. The hyper contextual persona vector and the geo-localized persona vector are used to generate, at 355, a user persona vector as a baseline persona model of the customer. The current persona vector determiner 350 may analyze the transcript of the current communication session and generate, at 365, a current persona vector accordingly based on text embeddings 360 previously trained. The current persona vector may then be input to the response generator 380, which may combine, at 375, the user persona vector with the current persona vector to generate a response input vector and then provide the response input vector, at 385, to the language model 370 to generate, at 395, a persona-adaptive response based on the input response input vector.

Figure 4A:
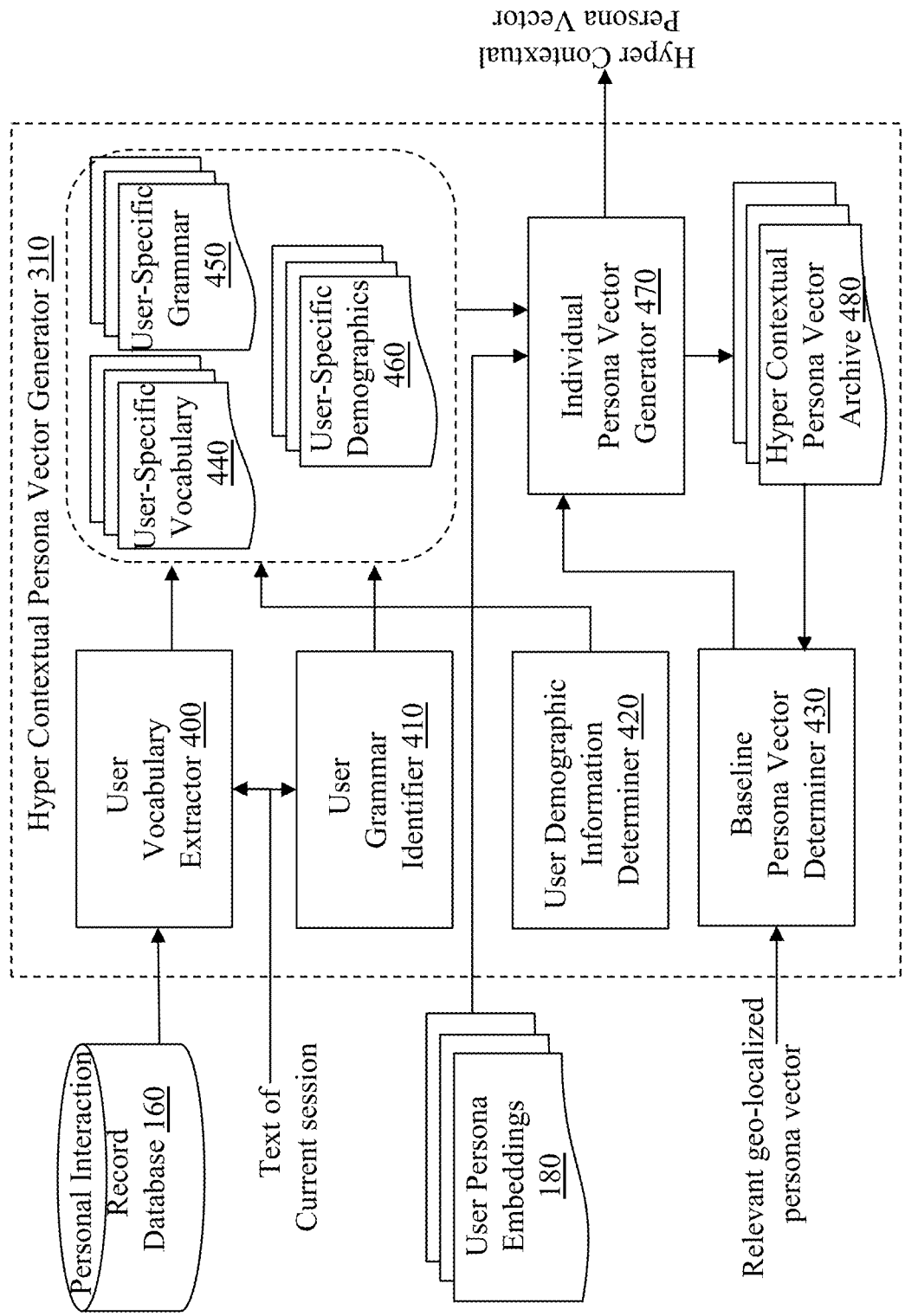
FIG. 4A depicts an exemplary high level system diagram of a hyper contextual persona vector generator, in accordance with an embodiment of the present teaching.

As seen in FIG. 3A, a hyper contextual persona vector and a geo-localized persona vector with respect to an ongoing communication are separately obtained based on transcripts of different communications using corresponding sets of embeddings (180 and 190). In some embodiments, the specific features captured by these vectors may also differ. Details relating to how to extraction of a hyper contextual persona vector and a geo-localized persona vector are provided herein with references to FIGS. 4A-5B. FIG. 4A depicts an exemplary high level system diagram of the hyper contextual persona vector generator 310, in accordance with an embodiment of the present teaching. In some embodiments, the hyper contextual persona vector generator 310 obtains a hyper contextual persona vector based on exemplary types of features, including vocabulary used, grammar used in expressions, some demographic information, etc. These features may be extracted from transcripts of the past and current communications and used to characterize the baseline persona of the customer. As illustrated in FIG. 4A, the hyper contextual persona vector generator 310 may include a user vocabulary extractor 400, a user grammar identifier 410, a user demographic information determiner 420, and an individual persona vector generator 470.

The user vocabulary extractor 400 may be provided to retrieve transcripts of the customer related communications (historic and current) for identifying words/phrases of choices of the customer to establish preferred user-specific vocabulary 440 for the customer, which may be applied in conducting persona-adaptive conversations with the customer. The user grammar identifier 410 may be provided for processing the transcripts of communications related to the customer (historic and current) to identify specific preferred grammar usages of the customer to establish user-specific grammar 450, which may be used in generating persona-adaptive responses in communications with the customer. The user demographics determiner 420 may be provided for obtaining certain demographic information of the customer to establish user-specific demographics 460.

In some embodiments, demographic information gathered on the customer and included in the user-specific demographics 460 may include those types that may be indicative of certain persona. For example, a customer may be in a certain age group that may be known to have a certain way of speaking. A customer who is from a certain geo-locale that is known to say certain things in certain ways (e.g., people living in England refer gas as "petrol" while people living in the United States refer gas as "gasoline" or simply "gas"). Thus, the collected demographic information about each customer may play a useful role in determining a persona to be used by the persona-adaptive chat system in conducting conversions with different customers with a persona that is appropriate for each of the customers.

For each customer, to generate a customer specific hyper contextual persona vector, the individual persona vector generator 470 may be provided for accessing the user-specific vocabulary (440), grammar (450), and demographic information (460) associated with the customer. In addition to the user-specific vocabulary/grammar/demographics, the individual persona vector generator 470 may also take as input the prior established baseline persona previously established for the customer from the baseline persona vector determiner 430 and using such accessed information to create a hyper contextual persona vector for the customer. The hyper contextual persona vector created based on such information for each customer may be stored in a hyper contextual persona vector archive 480 to provide an updated baseline individual persona vector. In this manner, the baseline persona vector for each customer adapts smoothly over time based on dynamic information.

When a customer is new, there may not be any transcript available for establishing the preferred customer-specific vocabulary and grammar and no prior established baseline persona vector for the customer, either. In this situation, the previously established hyper contextual persona vectors stored in the archive 480 may be used to provide an initial baseline persona vector for the new customer. For instance, the hyper contextual persona vector of other customer(s) with similar demographics may be used to create an initial estimated individual persona vector for the new customer. For example, the baseline persona determiner 430 may retrieve, from archive 480, hyper contextual persona vectors corresponding to customers with similar demographics and may estimate an initial baseline persona vector for the new customer by, e.g., combining the persona vectors of such similar customers. In some situations, when there are no other customers with similar demographics, the baseline persona vector determiner 430 may also utilize a geo-localized persona vector for a geo-locale where the new customer is to estimate an initial hyper contextual persona vector for the new customer. With more transcripts from communications over time involving the new customer, the user-specific vocabulary/grammar may be gradually established and used to adapt the hyper contextual persona vector for the new customer based on information related to the new customer. As seen in FIG. 4A, the hyper contextual persona vector for each customer is continually updated based on dynamically updated user-specific vocabulary/ grammar as well as the baseline persona vectors, facilitating adaptive persona tracking.

Figure 4B:
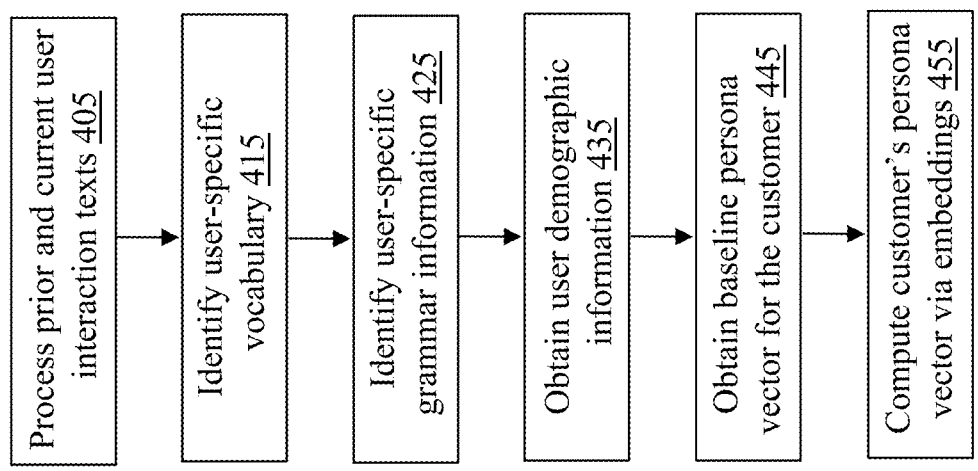
FIG. 4B is a flowchart of an exemplary process of a hyper contextual persona vector generator, in accordance with an embodiment of the present teaching.

FIG. 4B is a flowchart of an exemplary process of the hyper contextual persona vector generator 310, in accordance with an embodiment of the present teaching. In operation, upon accessing transcripts of both historic and current communications involving a customer, the user vocabulary extractor 400 and the user grammar identifier process, at 405, such transcripts and identifies, at 415 and 425, respectively, user-specific vocabulary (440) and user-specific grammar (450). In addition, the user demographic information determiner 420 obtains, at 435, relevant demographics of the customer. To consider the baseline persona for the customer, the baseline persona vector determiner 430 obtains, at 445, the baseline persona vector previously established for the customer. Based on the user-specific information (vocabulary/grammar/demographics) as well as the baseline persona vector of the customer, the individual persona vector generator 470 computes, at 455, the customer's hyper contextual persona vector based on the user persona embeddings previously learned via machine learning. The output hyper contextual persona vector is then sent to the user persona vector generator 330 (see FIG. 3A) for being combined with the geo-localized persona vector (from the geo-localized persona vector generator 320) to generate a user persona vector (see FIG. 2).

Figure 5A:
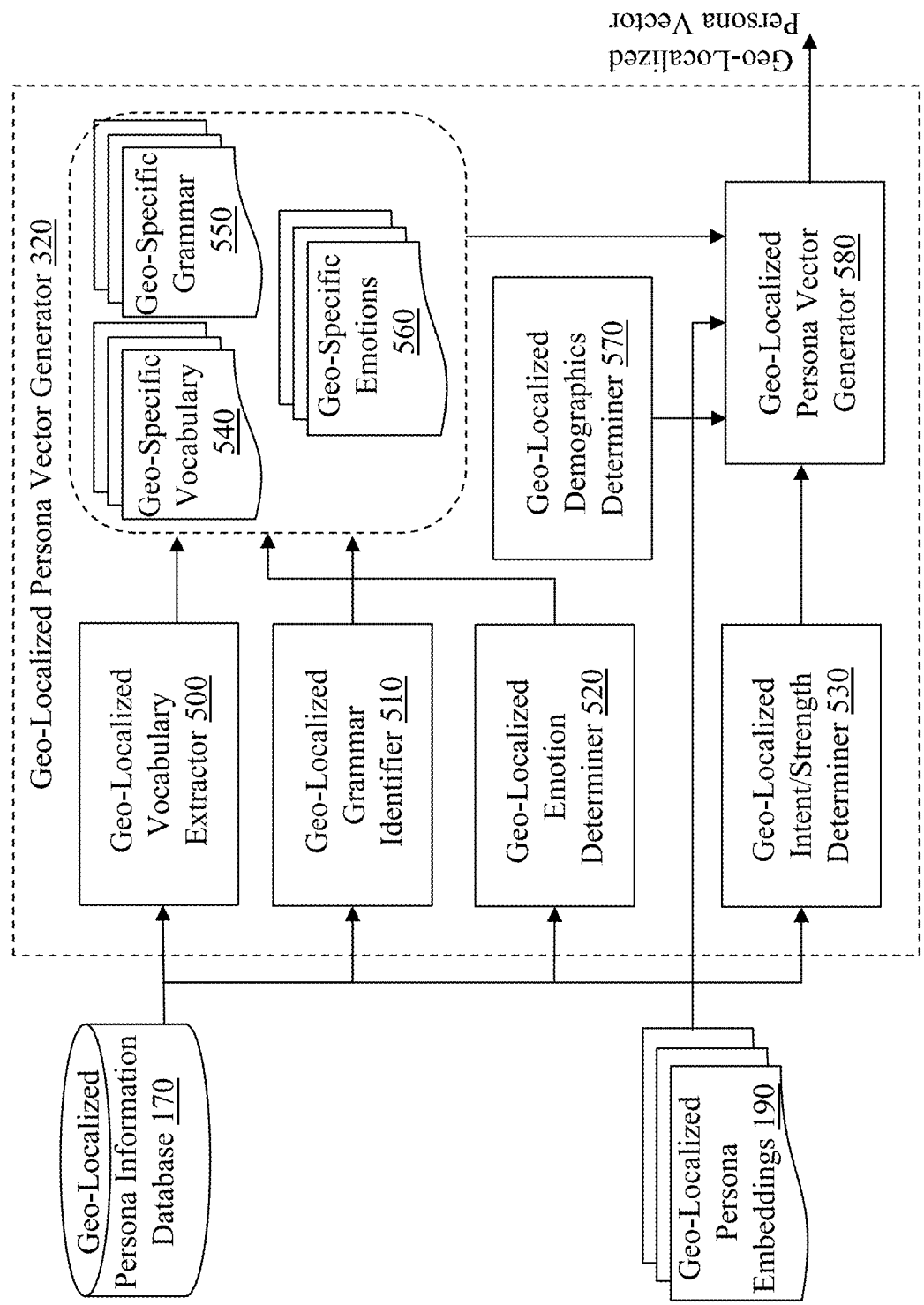
FIG. 5A depicts an exemplary high level system diagram of a geo-localized persona vector generator, in accordance with an embodiment of the present teaching.

FIG. 5A depicts an exemplary high level system diagram of the geo-localized persona vector generator 320, in accordance with an embodiment of the present teaching. In this illustrated embodiment, a geo-localized persona vector for a geo-locale may be established based on persona characteristics identified from transcripts of past communications occurred at the geo-locale. In some embodiments, some geo-locale related persona characteristics may include vocabulary/grammar typically adopted by customers in past communications occurred at the geo-locale. In addition to vocabulary and grammar, certain emotion(s) and/or intent(s) frequently detected in past communications associated with the geo-locale may also be relevant to a determination on the persona to be adopted in a conversation with a customer at the geo-locale. For example, from communications associated with an airport may often be associated with an intent to request for an international coverage and the emotion of being impatience because customers at such a geo-locale may often request what they need right before they are boarding a flight and, hence, appeared to be in a rush.

To establish the baseline persona of different geo-locales based on characteristics associated therewith, the illustrated geo-localized persona vector generator 320 comprises a geo-localized vocabulary extractor 500, a geo-localized grammar identifier 510, a geo-localized emotion determiner 520, a geo-localized intent/strength determiner 530, a geo-localized demographics determiner 570, and a geo-localized persona vector generator 580. The geo-localized vocabulary extractor 500 may be provided to retrieve transcripts of past communications with customers at each geo-locale. The retrieved transcripts may then be processed, with respect to each geo-locale, to identify words/phrases of choices typically used in communications at the geo-locale to establish geo-specific vocabulary 540 of the geo-locale. Such identified geo-specific vocabulary 540 may be used by the persona-adaptive chat system 110 to adapt the persona used to communicate with a customer at the geo-locale.

The geo-localized grammar identifier 510 may be provided for processing the transcripts of communications related to each geo-locale to identify specific grammar usages by customers at geo-locale for the purpose of establishing geo-specific grammar 550, which may be used in generating persona-adaptive responses in communications with a customer at the geo-locale. As discussed herein, communications (such as an airport) occurring at some geo-locales may often be associated with certain intent (e.g., calling a long-distance service company for international coverage at an airport). The geo-localized emotion determiner 520 may be provided to determine, from transcripts of communications with respect to each geo-locale, geo-specific emotions 560 expressed/exhibited by customers engaged in the communications at the geo-locale. Geo-specific emotion(s) associated with a geo-locale may be considered in determining an adaptive persona to be used in communicating with customers at the geo-locale. For example, if an anxious emotion is detected from communications of customers at, e.g., a hospital, to communicate with a customer at a hospital, the persona-adaptive chat system 110 may correspond with the customer in a persona with soft and kind way of communication style.

A geo-locale may have some statistically significant demographic characteristics. For example, a geo-locale may have a population that have a high percent of, e.g., young professional families. Geo-specific demographics of the main population at a geo-locale may give rise to certain persona characteristics that may also contribute to the decision on an adaptive persona used when communicating with customers from or at the geo-locale. The geo-localized demographics determiner 570 may be provided to identify geo-specific demographical characteristics that may serve as an input to the geo-localized persona generator 580 so that geo-specific demographics of each geo-locale may be considered in generating a geo-localized persona vector. The geo-localized intent/strength determiner 530 may be provided for detecting intent(s) associated with each geo-locale from transcripts of communications occurred at that geo-locale and the strength thereof. For example, an intent may be detected with a relatively higher frequency from conversations occurred at an airport to get an international coverage. The strength of such an intent may be determined based on, e.g., the number of occurrences detected in a specified timeframe. Other means to measure the strength of each detected geo-specific intent may also be employed. An application dependent criterion may be defined and used to filter out intents with low strength according to such a criterion.

As discussed herein, various geo-specific features detected from communications associated with a geo-locale may be provided to the geo-localized persona vector generator 580 which generates a geo-localized persona vector for the geo-locale based on the geo-localized persona embeddings 190. As shown in FIG. 3A, such a generated geo-localized persona vector for a geo-locale is then provided to the user persona vector generator 330 to be combined with a hyper contextual persona vector (generated by the hyper contextual persona vector generator 310) to create a user persona vector.

Figure 5B:
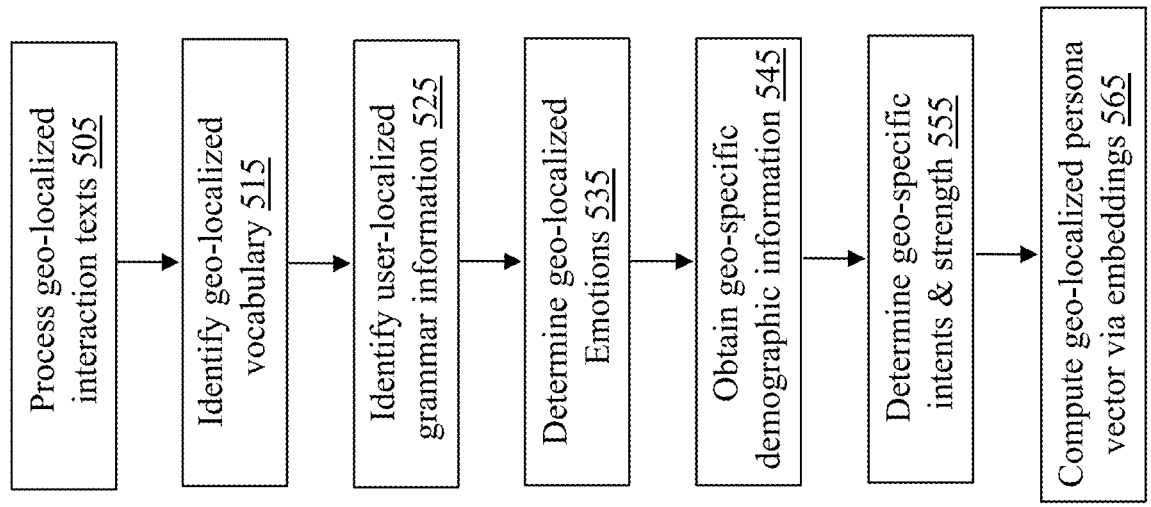
FIG. 5B is a flowchart of an exemplary process of a geo-localized persona vector generator, in accordance with an embodiment of the present teaching.

FIG. 5B is a flowchart of an exemplary process of the geo-localized persona vector generator 320, in accordance with an embodiment of the present teaching. When transcripts of communications related to a geo-locale are retrieved from the geo-localized persona information database 170, various components in the geo-localized persona vector generator 320 process, at 505, the textual information of the communication and identify different types of geo-specific information. As illustrated in FIGS. 5A and 5B, the geo-localized vocabulary extractor 500 identifies, at 515, geo-specific vocabulary 540 for the geo-locale; the geo-localized grammar identifier 510 identifies, at 525, geo-specific grammar information 550; the geo-localized emotion determiner 520 determines, at 535, geo-specific emotion (s) 560; the geo-localized demographics determiner 570 obtains, at 545, characteristic demographic information related to the geo-locale; and the geo-localized intent/strength determiner 530 detects certain geo-specific intent(s) and corresponding strength, at 555, based on the transcripts of the communications associated with the geo-locale. When the geo-localized persona vector generator 580 receives such detected geo-specific information, it computes, at 565, a geo-localized persona vector for the geo-locale based on the geo-localized persona embeddings 190.

As illustrated in FIG. 3A, when the persona-adaptive chat system 110 interacts with a customer at a geo-locale, the persona-adaptive chat system 110 obtains a response input vector (FIG. 2) that captures both the baseline persona of the customer (characterized by a combination of a hyper contextual persona vector for the customer and a geo-localized persona vector for the geo-locale of the customer) as well as the current persona of the customer exhibited in the ongoing communication. Based on the response input vector, the persona-adaptive response generator 380 of the persona-adaptive chat system may invoke the language model 370 to generate persona-adaptive responses in the ongoing the communication. The language model 370 may be previously trained via machine learning. The language model 520 may be implemented using technologies either existing today or developed in the future. Existing technologies that may be deployed to implement the language model 370 may include different transformers or modeling approaches, including but is not limited to, generative pretrained transformer (GPT), bidirectional encoder representations from transformers (BERT) and its variation (e.g., a lite BERT or ALBERT, decoding-enhanced BERT or DeBERT, robustly optimized BERT pretraining approach or RoBERT), transformer for extra-long strings (Transformer-XL), text-to-text transformer (T5), or pathway-based language modeling (PaLM). These exemplary language models may be trained to operate as a transformer to transform input into a linguistic word, phrase, or sentence as its output. Different language models may be pretrained using different approaches, including Pegasus that pretrains a model with extracted gap sentences for abstractive summarization sequence-to-sequence modeling, XLNet that pretrains via unsupervised language representation learning approach based on generalized permutation language modeling, or ELECTRA for efficiently learning an encoder for classifying token replacement accurately.

In pretraining, the language model 520 may be trained based on past conversations to take response input vectors (computed from the training data) and produce (transform into) a response that is adapted to exhibit the persona captured by the response input vectors. In deployment, such a pretrained language model may operate as it is trained, i.e., taking response input vectors representing baseline personas of different customers and their geo-locales as well as the current personas exhibited during the ongoing conversations. Due to pretraining, the language model 370 embodies the knowledge learned during training about the transformation between response input vectors and responses with an appropriate persona adapted to each customer and geo-locale.

Figure 6:
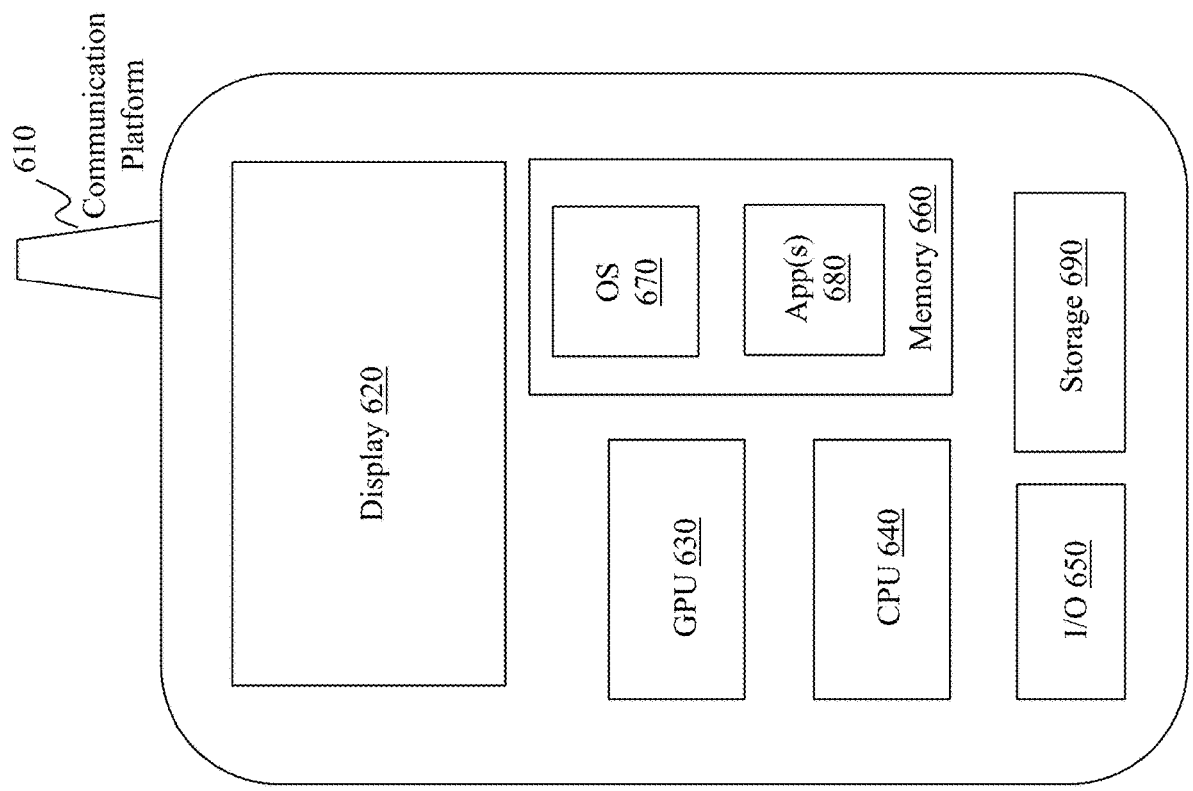
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or a mobile computational unit in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.) and one or more applications 680 may be loaded into memory 660 from storage 690 in order to be executed by the CPU 640. The applications 680 may include a user interface or any other suitable mobile apps for information exchange, analytics, and management according to the present teaching on, at least partially, the mobile device 600. User interactions, if any, may be achieved via the I/O devices 650 and provided to the various components thereto.

To implement various modules, units, and their functionalities as described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
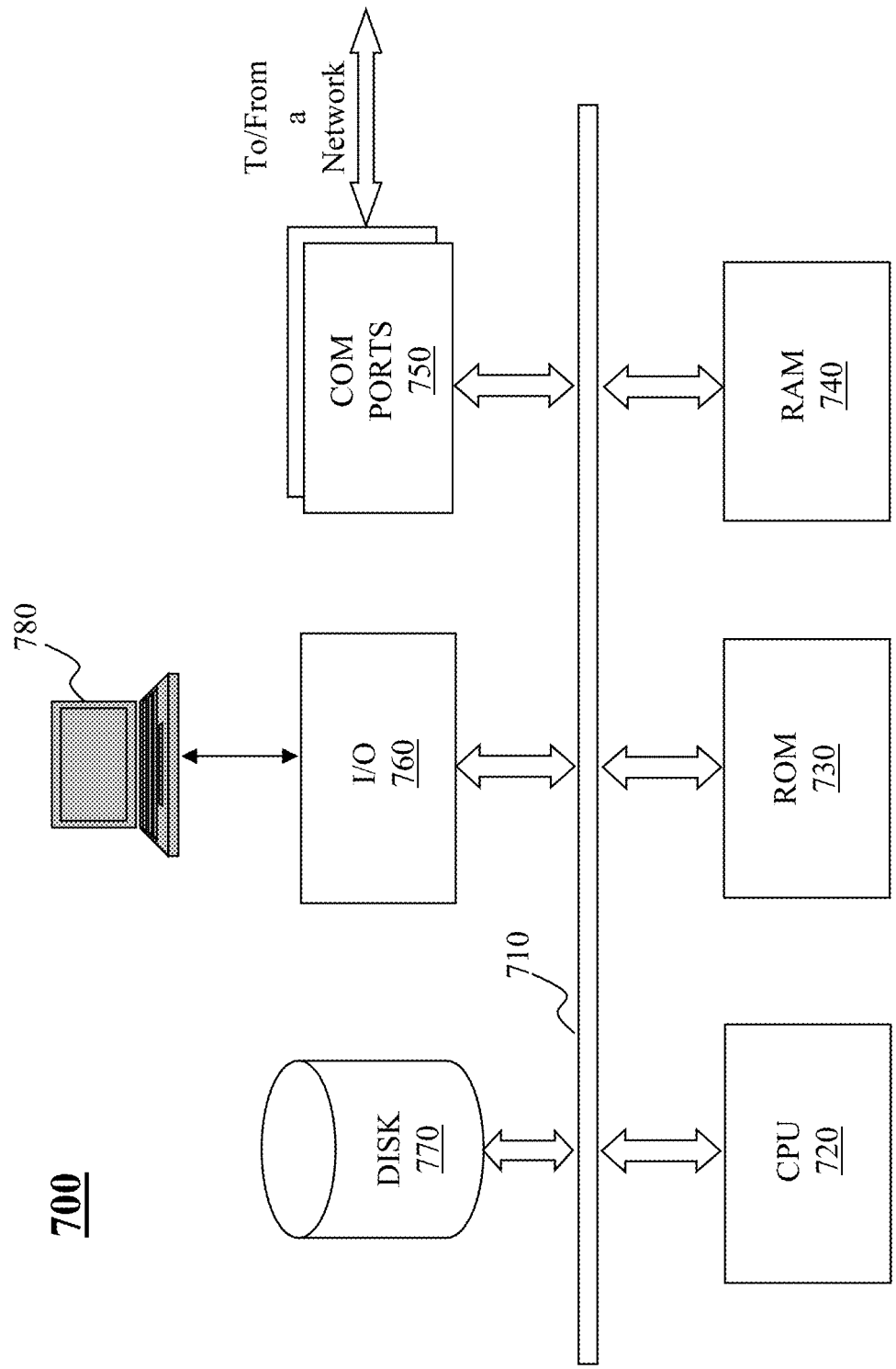
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information processing and analytical method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

It is noted that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

In the preceding specification, various example embodiments have been described with reference to the accompanying drawings. It will, however, be evident that various modifications and changes may be made thereto, and additional embodiments may be implemented, without departing from the broader scope of the present teaching as set forth in the claims that follow. The specification and drawings are accordingly to be regarded in an illustrative rather than restrictive sense.

We claim:

1. A method, comprising:
   receiving a transcript of a current communication with a customer at a geo-locale;
   retrieving a first set of transcripts of historic communications associated with the customer and a second set of transcripts of historic communications that occurred at the geo-locale;
   computing a user persona vector based on
      a hyper contextual persona vector obtained based on the transcript and the first set of transcripts, wherein the hyper contextual persona vector characterizes a first persona of the customer exhibited in the current and the historic communications, and
      a geo-localized persona vector obtained based on the second set of transcripts, wherein the geo-localized persona vector characterizes a second persona of the geo-locale;
   computing a current persona vector based on the transcript to characterize a current persona of the customer exhibited in the current communication;
   generating, by a language model, a persona-adaptive response based on the user persona vector and the current persona vector, wherein the persona-adaptive response is expressed with a persona dynamically adapted with respect to the customer and the geo-locale; and
   sending the persona-adaptive response to the customer.

2. The method of claim 1, wherein the computing the user persona vector comprises:
   processing the transcript and the first set of transcripts to generate a first processed result;
   identifying a first plurality of features relating to the first persona of the customer based on the first processed result; and computing the hyper contextual persona vector based on the first plurality of features and user persona embeddings previously trained via machine learning.

3. The method of claim 2, wherein the first plurality of features include at least one of:
   user-specific vocabulary with words/phrases used by the customer in the current and historic communications;
   user-specific grammar used by the customer in the current and historic communications; and
   user-specific demographic information about the customer.

4. The method of claim 2, further comprising:
   processing the second set of transcripts to generate a second processed result;
   determining a second plurality of features relating to the second persona of the geo-locale based on the second processed result;
   computing the geo-localized persona vector based on the second plurality of features and geo-localized persona embeddings previously trained via machine learning;
   generating the user persona vector by combining the hyper contextual persona vector and the geo-localized persona vector.

5. The method of claim 4, wherein the second plurality of features determined based on the second processing result include at least one of:
   geo-specific vocabulary with words/phrases used by customers in the historic communications at the geo-locale;
   geo-specific grammar used by customers in the historic communications at the geo-locale;
   geo-specific emotions detected from customers in the historic communications at the geo-locale;
   geo-specific demographic information associated with the geo-locale; and
   geo-specific intent and strengthen thereof exhibited in the historic communications at the geo-locale.

6. The method of claim 1, wherein the language model is pretrained via deep learning to predict a response to a customer engaged in a communication at a geo-locale with a persona adaptively determined based on an input response input vector characterizing both a first persona of the customer and a second persona of the geo-locale.

7. The method of claim 1, wherein the persona-adaptive response is delivered to the customer via one of a textual form and a voice form, wherein the voice form is generated by:
   creating the textual form of the persona-adaptive response; and
   converting the textual form of the persona-adaptive response into a voice signal via text-to-speech transformation.

8. A machine readable and non-transitory medium having information recorded thereon, wherein the information, when read by the machine, causes the machine to perform the following steps:
   receiving a transcript of a current communication with a customer at a geo-locale;
   retrieving a first set of transcripts of historic communications associated with the customer and a second set of transcripts of historic communications that occurred at the geo-locale;
   computing a user persona vector based on
      a hyper contextual persona vector obtained based on the transcript and the first set of transcripts, wherein the hyper contextual persona vector characterizes a first persona of the customer exhibited in the current and the historic communications, and
      a geo-localized persona vector obtained based on the second set of transcripts, wherein the geo-localized persona vector characterizes a second persona of the geo-locale;
   computing a current persona vector based on the transcript to characterize a current persona of the customer exhibited in the current communication;
   generating, by a language model, a persona-adaptive response based on the user persona vector and the current persona vector, wherein the persona-adaptive response is expressed with a persona dynamically adapted with respect to the customer and the geo-locale; and
   sending the persona-adaptive response to the customer.

9. The medium of claim 8, wherein the computing the user persona vector comprises:
   processing the transcript and the first set of transcripts to generate a first processed result;
   identifying a first plurality of features relating to the first persona of the customer based on the first processed result; and
   computing the hyper contextual persona vector based on the first plurality of features and user persona embeddings previously trained via machine learning.

10. The medium of claim 9, wherein the first plurality of features include at least one of:
    user-specific vocabulary with words/phrases used by the customer in the current and historic communications;
    user-specific grammar used by the customer in the current and historic communications; and
    user-specific demographic information about the customer.

11. The medium of claim 9, wherein the information, when read by the machine, further causes the machine to perform the following steps:
    processing the second set of transcripts to generate a second processed result;
    determining a second plurality of features relating to the second persona of the geo-locale based on the second processed result;
    computing the geo-localized persona vector based on the second plurality of features and geo-localized persona embeddings previously trained via machine learning;
    generating the user persona vector by combining the hyper contextual persona vector and the geo-localized persona vector.

12. The medium of claim 11, wherein the second plurality of features determined based on the second processing result include at least one of:
    geo-specific vocabulary with words/phrases used by customers in the historic communications at the geo-locale;
    geo-specific grammar used by customers in the historic communications at the geo-locale;
    geo-specific emotions detected from customers in the historic communications at the geo-locale;
    geo-specific demographic information associated with the geo-locale; and
    geo-specific intent and strengthen thereof exhibited in the historic communications at the geo-locale.

13. The medium of claim 8, wherein the language model is pretrained via deep learning to predict a response to a customer engaged in a communication at a geo-locale with a persona adaptively determined based on an input response input vector characterizing both a first persona of the customer and a second persona of the geo-locale.

14. The medium of claim 8, wherein the persona-adaptive response is delivered to the customer via one of a textual form and a voice form, wherein the voice form is generated by:
creating the textual form of the persona-adaptive response; and
converting the textual form of the persona-adaptive response into a voice signal via text-to-speech transformation.

15. A system, comprising:
a user interaction unit implemented by a processor and configured for receiving a transcript of a current communication with a customer at a geo-locale;
a persona-adaptive response generator implemented by a processor and configured for
retrieving a first set of transcripts of historic communications associated with the customer and a second set of transcripts of historic communications that occurred at the geo-locale,
computing a user persona vector based on
a hyper contextual persona vector obtained based on the transcript and the first set of transcripts, wherein the hyper contextual persona vector characterizes a first persona of the customer exhibited in the current and the historic communications, and
a geo-localized persona vector obtained based on the second set of transcripts, wherein the geo-localized persona vector characterizes a second persona of the geo-locale,
computing a current persona vector based on the transcript to characterize a current persona of the customer exhibited in the current communication, and
generating, by a language model, a persona-adaptive response based on the user persona vector and the current persona vector, wherein the persona-adaptive response is expressed with a persona dynamically adapted with respect to the customer and the geo-locale; and
the user interaction unit is further configured for sending the persona-adaptive response to the customer.

16. The system of claim 15, wherein the persona-adaptive response generator comprises a user persona vector generator implemented by a processor and configured for computing the user persona vector by:
processing the transcript and the first set of transcripts to generate a first processed result;

identifying a first plurality of features relating to the first persona of the customer based on the first processed result; and
computing the hyper contextual persona vector based on the first plurality of features and user persona embeddings previously trained via machine learning.

17. The system of claim 16, wherein the first plurality of features include at least one of:
user-specific vocabulary with words/phrases used by the customer in the current and historic communications;
user-specific grammar used by the customer in the current and historic communications; and
user-specific demographic information about the customer.

18. The medium of claim 16, wherein the user persona vector generator is further configured for:
processing the second set of transcripts to generate a second processed result;
determining a second plurality of features relating to the second persona of the geo-locale based on the second processed result;
computing the geo-localized persona vector based on the second plurality of features and geo-localized persona embeddings previously trained via machine learning;
generating the user persona vector by combining the hyper contextual persona vector and the geo-localized persona vector.

19. The system of claim 18, wherein the second plurality of features determined based on the second processing result include at least one of:
geo-specific vocabulary with words/phrases used by customers in the historic communications at the geo-locale;
geo-specific grammar used by customers in the historic communications at the geo-locale;
geo-specific emotions detected from customers in the historic communications at the geo-locale;
geo-specific demographic information associated with the geo-locale; and
geo-specific intent and strengthen thereof exhibited in the historic communications at the geo-locale.

20. The system of claim 15, wherein the language model is pretrained via deep learning to predict a response to a customer engaged in a communication at a geo-locale with a persona adaptively determined based on an input response input vector characterizing both a first persona of the customer and a second persona of the geo-locale.

* * * * *